US008805938B2

(12) United States Patent  (10) Patent No.: US 8,805,938 B2
Yu  (45) Date of Patent: Aug. 12, 2014

(54) ENTERPRISE SERVICE BUS AND MESSAGE PROCESSING METHOD THEREOF (75) Inventor: Gang Yu, Shanghai (CN)

(73) Assignee: XiBen New Line Stock Co., Ltd., Shanghai (CN)

( * ) Notice: Subject to any disclaimer, the term of this patent is extended or adjusted under 35 U.S.C. 154(b) by 286 days.

(21) Appl. No.: 12/935,239

(22) PCT Filed: Aug. 26, 2010

(86) PCT No.: PCT/CN2010/076364

§ 371 (c)(1),
(2), (4) Date: Sep. 28, 2010

(87) PCT Pub. No.: WO2011/150600

PCT Pub. Date: Dec. 8, 2011

(65) Prior Publication Data

US 2011/0302254 A1  Dec. 8, 2011

(30) Foreign Application Priority Data

Jun. 4, 2010 (CN) .......................... 2010 1 0197480

(51) Int. Cl.
*H04L 29/00* (2006.01)
*G06F 9/54* (2006.01)

(52) U.S. Cl.
CPC ..................................... *G06F 9/546* (2013.01)
USPC ........................................................ 709/206

(58) Field of Classification Search
None
See application file for complete search history.

(56) References Cited

U.S. PATENT DOCUMENTS

2008/0201719 A1  8/2008 Daniel et al.

(Continued)

FOREIGN PATENT DOCUMENTS

| CN | 1740974 A | 3/2006 |
|---|---|---|
| CN | 101459609 A | 6/2009 |
| CN | 101651631 A | 2/2010 |
| CN | 101656659 A | 2/2010 |
| CN | 102025653 B | 1/2014 |
| KR | 20080076633 A | 8/2008 |

OTHER PUBLICATIONS

M.-T.Schmidt, B.Hutchinson, P.Lambros, R.Phippen/ The Enterprise Service Bus: MAking service oriented archetecture real/ 2005/ IBM Systems Journal/vol. 44, No. 4/ pp. 781-797.*
International Search Report regarding Application No. PCT/CN2010/076364, mailed Mar. 10, 2011. Translation provided by Unitalen Attorneys at Law.

(Continued)

*Primary Examiner* — Brandon Hoffman
*Assistant Examiner* — Michael D Anderson
(74) *Attorney, Agent, or Firm* — Harness, Dickey & Pierce, P.L.C.

(57) ABSTRACT

An enterprise service bus (ESB) and message processing method thereof are disclosed. The ESB includes: a message receiving unit, a message queuing unit, a processing-thread-group, and a request processing unit. The message receiving unit includes multiple message receiving channels which are used to receive messages each having at least one service request. The message queuing unit is used to receive messages from the multiple message receiving channels and to sort the messages according to predefined rules. The processing-thread-group is used to receive a predefined number of sorted messages from the message queuing unit. The request processing unit is used to acquire service requests of the messages from the processing-thread-group and to process the service requests. The present disclosure integrates various application programs into an electronic trading platform, and achieves program invocation by ESB. Therefore, service users are no longer required to perform complicated asynchronous invocations, while ESB is used to convert a synchronous mode to an asynchronous mode.

26 Claims, 4 Drawing Sheets (56) References Cited

U.S. PATENT DOCUMENTS

2009/0064298 A1* 3/2009 Yamamoto et al. ............... 726/6
2009/0080432 A1   3/2009 Kolakeri et al.
2010/0257240 A1* 10/2010 Singh et al. .................. 709/204

OTHER PUBLICATIONS

International Search Report regarding Application No. PCT/CN2010/076364, mailed Mar. 10, 2011.
Written Opinion of the International Searching Authority regarding Application No. PCT/CN2010/076364, mailed Mar. 10, 2011.

* cited by examiner

ENTERPRISE SERVICE BUS AND MESSAGE PROCESSING METHOD THEREOF

CROSS-REFERENCE TO RELATED APPLICATIONS

This application is a 371 U.S. National Stage of International Application No. PCT/CN2010/076364, filed Aug. 26, 2010. This application claims the benefit of Chinese Patent Application No. 201010197480.7, filed Jun. 4, 2010. The disclosures of the above applications are incorporated herein by reference.

BACKGROUND OF THE INVENTION

1. Field of the Invention

The invention relates to e-commerce and transaction field, and particularly relates to an enterprise service bus and message processing method thereof applied in e-commerce trading platform.

2. Description of the Prior Art

Nowadays, application integration among large enterprise networks is becoming increasingly complex so that traditional point-to-point system integration can not perform well. To solve this problem, the concept of enterprise service bus (ESB) is devised. An ESB has various inter-independent subsystems which access a common information platform in a way of plug-in, and performs unified data schedule by a schedule engine, achieving a highly efficient data and business integration. The term "Enterprise Service Bus" (ESB) is defined, by the Gartner Group, as a new architecture that exploits Web services, messaging middleware, intelligent routing, and transformation. An ESB is a combination of traditional middleware with XML and Web services, and acts as a backbone in a network. The technology goal of ESB is to achieve application integration in a standardized way, for connection, communication and interoperation of enterprise application systems. The standardization includes connector standardization, management standardization, and message standardization.

The ESB has changed traditional software architecture for providing lower cost solutions than traditional middleware. The ESB eliminates technical differences among different applications to achieve their coordination, communication and integration. From the functional point of view, the ESB provides event-driven and document-oriented processing models and distributed management mechanism. The ESB supports content-based routing and filtering, possesses transmission capability for complex data, and provides a range of standard interfaces. As an example, Chinese patent application No. 200810227316.9 discloses a method for implementing ESB.

Service users of existing e-commerce trading platforms directly invoke service providers in a many-to-many and orderless way, which makes maintenance and management of applications very hard. Service users often have a tight coupling with implementation of background services, which makes it hard to tell the number of users for one service application or the number of service applications for one user. The reliability, transaction processing, synchronous/asynchronous communication, security certification management all require separate implementation of service providers and service users. However, the existing e-commerce trading platforms lack of a common architecture. The existing e-commerce trading platforms fail to provide a unified way for supervision and analysis over background services, leading to difficult maintenance and management of service-oriented architecture (SOA) applications.

SUMMARY OF THE INVENTION

An object of the present invention is to provide an enterprise service bus (ESB), which is used in enterprise's electronic trading platforms to achieve application integration. Service users are no longer required to perform complicated asynchronous invocations, while the ESB is adapted to convert a synchronous mode to an asynchronous mode.

To achieve the object, the present invention provides an enterprise service bus (ESB). The ESB includes a message receiving unit, a message queuing unit, a processing-thread-group, and a request processing unit. The message receiving unit includes multiple message receiving channels. Each message receiving channel is for receiving messages each having at least one service request. The message queuing unit is for receiving messages from the multiple message receiving channels and for sorting the messages according to predefined rules. The processing-thread-group is for receiving a predefined number of sorted messages from the message queuing unit. The request processing unit is for acquiring service requests from messages from the processing-thread-group and for processing the service requests.

Optionally, the sorting the messages according to predefined rules includes sorting the messages according to time sequence of message sending or message receiving.

Optionally, each of the messages has at least two service requests. The ESB further includes a request splitting unit for splitting the messages into service requests and sending the service requests to the message receiving unit.

Optionally, each of the messages has at least two service requests. The ESB further includes a request splitting unit for splitting the messages received from the message receiving unit into service requests and sending the service requests to the message queuing unit.

Optionally, each of the messages has at least two service requests. The ESB further includes a request splitting unit for splitting the messages received from the message queuing unit into service requests and sending the service requests to the processing-thread-group.

Optionally, the request processing unit includes various types of request processing channels, each request processing channel for processing one type of service request.

Optionally, the processing the service requests by the request processing unit includes generating at least one access request according to a predefined procedure and invoking corresponding application services according to the access request.

Optionally, the ESB further includes a request transmission channel for transmitting the access request generated by the request processing unit to corresponding application services.

Optionally, the messages each having at least one service request are encrypted and the ESB further includes a decryption unit for decrypting the messages before the request processing unit processing the service requests according to a predefined procedure.

To achieve the object, the present invention provides a message processing method of ESB, which includes: receiving messages each having at least one service request, sorting the received messages according to predefined rules, and processing service requests from a predefined number of the sorted messages.

Optionally, each of the messages has at least two service requests and the message processing method further includes splitting the messages into service requests.

Optionally, the processing service requests includes generating at least one access request according to a predefined procedure and invoking corresponding application services according to the access request.

Optionally, the messages each having at least one service request are encrypted and the message processing method further includes decrypting the messages before processing service requests.

Compared with the prior art, the present invention has the following advantages.

When an ESB provided in the present invention is applied in an electronic trading platform, service users do not have to invoke services from service providers directly. Service users and service providers are connect with the electronic trading platform through standard interfaces. The electronic trading platform integrates various applications through the ESB, which achieves communication and invokation among applications. Service users are no longer required to perform complicated asynchronous invocations, while ESB is adapted to convert a synchronous mode to an asynchronous mode.

The ESB provided in the present invention has the processing-thread-group to limit the number of messages to be processed by an electronic trading platform. The ESB won't respond to excessive messages to avoid crash of the electronic trading platform caused by service invokation on one service.

DETAILED DESCRIPTION OF THE EMBODIMENTS

When an ESB provided in the present invention is applied in an electronic trading platform, service users do not have to invoke services from service providers directly. Service users and service providers are connect with the electronic trading platform through standard interfaces. The electronic trading platform integrates various applications through the ESB, which achieves communication and invokation among applications. Service users are no longer required to perform complicated asynchronous invocations, while ESB is adapted to convert a synchronous mode to an asynchronous mode. Furthermore, the ESB provided in the present invention has the processing-thread-group to limit the number of messages to be processed by an electronic trading platform. The ESB won't respond to excessive messages to avoid crash of the electronic trading platform caused by service invokation on one service.

Figure 1:
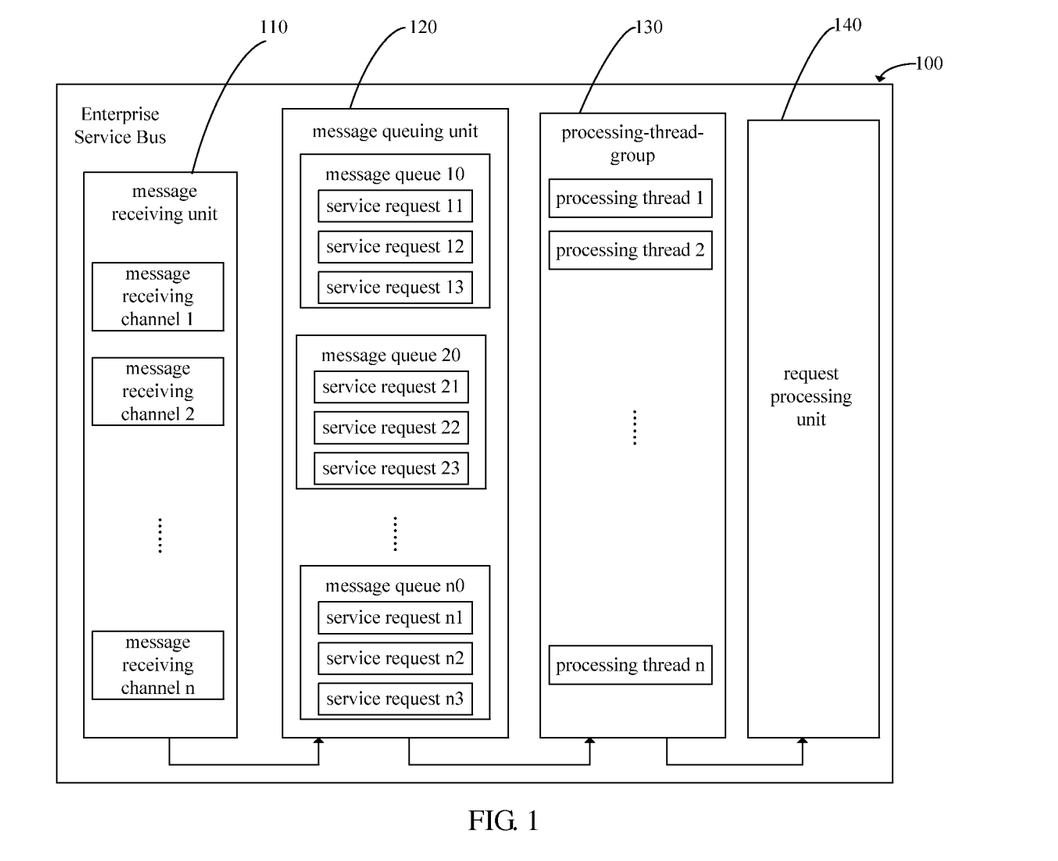
FIG. 1 schematically illustrates internal architecture of an ESB in an embodiment of the present invention.

Referring to FIG. 1, an ESB 100 in an embodiment of the present invention comprises a message receiving unit 110, which is for receiving messages from multiple service users. The message receiving unit 110 includes multiple message receiving channels, which are a message receiving channel 1, a message receiving channel 2 . . . and a message receiving channel n. Each message receiving channel receives messages which have at least one service request. To decrease service users' operations on different service requests, each message receiving channel includes at least one service request, and service users can make multiple service requests at one time. When service users make multiple service requests at one time, the multiple service requests will be packaged by a request-packaging-unit (not shown) and then send the service requests in the form of a message. In an embodiment of the present invention, each of the messages has at least two service requests. The ESB further comprises a request splitting unit (not shown), which is for splitting the messages into service requests and sending the service requests to the message receiving unit 110. In an embodiment of the present invention, the message receiving channel invokes an encryption unit to encrypt the messages received by the message receiving channel.

The ESB 100 further comprises a message queuing unit 120. The message queuing unit 120 is for receiving messages from the message receiving unit 110, and for sorting the multiple messages from the multiple message receiving channels according to time sequence. In another word, earlier messages get earlier process. The time sequence here is identified by time when service users make service requests. The time sequence can also be identified by time when service requests are received by the message queuing unit 120. Referring to FIG. 1, sorted message queues are message queue 10, message queue 20 . . . message queue n0. Before the messages are processed by the message queuing unit 120, the message queuing unit 120 invokes a request splitting unit (not shown) to split a message into service requests. Here, the number of the service requests is the same with the number of service requests made by service users. Referring to FIG. 1, a message in message queue 10 is split into service request 11, service request 12, and service request 13. A message in message queue 20 is split into service request 21, service request 22 and service request 23 . . . and a message in message queue n0 are split into service request n1, service request n2 and service request n3. It should be noted that splitting each message into three service requests in this embodiment is just an example. In specific embodiments, the number of service requests within a message depends on specific conditions (users' operation). It should be noted that sorting messages according to time sequence in this embodiment is just an example. In specific embodiments, messages in the message queuing unit are sorted according to other predefined rules such as message priority (importance).

In another embodiment of the present invention, the work of splitting messages into service requests is done before the message receiving unit receives messages. The messages each has at least two service requests. The ESB further comprises a request splitting unit. The request splitting unit is for splitting messages each having at least one service request into service requests and sending the service requests to the message queuing unit. In another embodiment of the present invention, the work of splitting messages into service requests is done before a processing-thread-group receives messages. The messages each has at least two service requests. The ESB further comprises a request splitting unit. The request splitting unit is for receiving messages from the message queuing unit and sending the service requests to a processing-thread-group.

The ESB 100 further comprises a processing-thread-group 130. The processing-thread-group 130 includes a predefined number of processing threads which are a processing thread 1, a processing thread 2 . . . and a processing thread n. The processing threads are for receiving a predefined number of sorted messages from the message queuing unit 120. The number of processing threads in the processing-thread-group 130 is a predefined number, which is set according to the processing ability of an electronic trading platform. For example, the number of processing threads in the processing-thread-group 130 is 200, which means that only 200 messages can be processed at the same time. The electronic trading platform won't respond to other messages to avoid crash caused by excessive service invokation on one service, which guarantees the normal operation of the electronic trading platform. The processing thread 1 stores the service request 11, the service request 12, and the service request 13 of the message queue 10. The processing thread 2 stores the service request 21, the service request 22 and the service request 23 of the message queue 20 . . . and the processing thread n stores the service request n1, the service request n2, and the service request n3 of the message queue n0.

Figure 2:
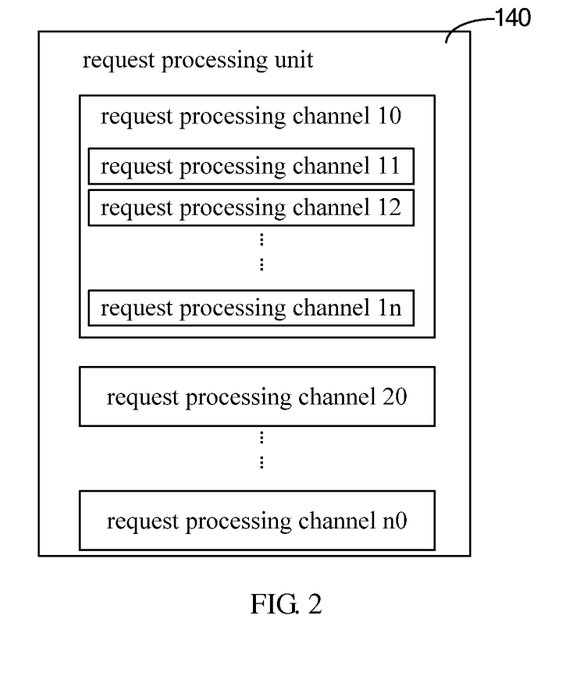
FIG. 2 schematically illustrates architecture of a request processing unit.

The ESB 100 further comprises a request processing unit 140. The request processing unit 140 is for acquiring service requests from messages from the processing-thread-group 130, and for processing the service requests. In a specific embodiment, the request processing unit 140 comprises various types of request processing channels. Each type of request processing channel is for processing one type of service request. Referring to FIG. 2, the request processing unit 140 includes various types of request processing channels, which are a $1^{st}$ type request processing channel 10, a $2^{nd}$ type request processing channel 20 . . . and an $n^{th}$ type request processing channel n0. Each type of request processing channel includes multiple request processing channels and processes multiple service requests of the same type. Taking the $1^{st}$ type request processing channel 10 for example, it includes multiple request processing channels which are a request processing channel 11, a request processing channel 12 . . . and a request processing channel 1n. The processing-thread-group 130 receives messages from the message queuing unit 120, and sends the messages which are already split into service requests to corresponding request processing channels. It should be noted that each type of service request has a corresponding type of request processing channel. Service requests of one type will be sent to and processed by the corresponding type of request processing channel. In this embodiment, work of each type of request processing channel includes a decryption stage and a processing stage. The decryption stage is corresponding to the encryption unit invoked by the message receiving channel. The decryption stage decrypts messages received. In other embodiments, the work of each type of request processing channel can include different stages such as a decompression stage. In this embodiment, processing service requests in the processing stage includes: generating at least one access request and invoking corresponding application services according to the access request. The application services are from service providers, and invoked by access requests. During the processing stage of request processing channels, access requests are generated according to a predefined procedure. Application services are invoked by access requests, and generate results for the access requests.

In one embodiment of the present invention, the ESB further comprises a request transmission channel. The request transmission channel is for performing addressing, and for transmitting the access request generated by the request processing unit to corresponding application services.

The foregoing remarks have described a process of how service users send messages to application services. Application services will generate results for access requests and send the results back to the service users. In this embodiment of the present invention, a process of how application services send results back to service users is a reverse of the process of how service users send messages to application services. First, the request transmission channel sends a result message back to a corresponding request processing channel. The request processing channel then encrypts the result message and sends it to a corresponding processing thread. The result message is then sent to a corresponding message queue by the processing thread, and to a corresponding message receiving channel at last. After all result messages for service requests in a message are received, the message receiving channel invokes a request-packaging-unit to package all result messages and sends to a corresponding service user. The service user now gets a result for a service request. It should be noted that the term "corresponding" used here means that result messages goes back to the service user along the same path with service requests.

The messages in the present invention can be transaction messages of different products. Taking e-commerce transactions of steel for example, transaction messages include spot goods transaction messages (corresponding to in-warehouse and ex-warehouse for steel), and contracted transaction messages (corresponding to intent of purchase and sale). Transaction messages also include registration information (corresponding to registering as a member of electronic trading platform), product update information, and cancellation information (corresponding to cancellation of membership of electronic trading platform). Transaction messages also include register information update messages (corresponding to updating member information), point check messages, and credit check messages.

Taking the inquiry of points and credit for example, service users send an inquiry message for user information. A message receiving channel of a message receiving unit receive the inquiry message for user information. Since user information includes point information, and credit information, the inquiry message for user information includes point service request and credit service request. The point service request and credit service request are packaged and sent to a message receiving channel of a message receiving unit. After receiving the inquiry message for user information, the message receiving channel invokes an encryption unit to encrypt the inquiry message for user information. The inquiry message for user information is then sent to a message queuing unit. The message queuing unit can also acquire the inquiry message for user information from the message queuing unit. On receiving the inquiry message, the message queuing unit invokes a request splitting unit which splits the inquiry message for user information into a corresponding point service request and a corresponding credit service request. Therefore, the inquiry message in the message queuing unit has been split into service requests. Referring to FIG. 1, for example, if the inquiry message for user information is in the message queue 10, the point service request is corresponding to the service request 11, and the credit service request is corresponding to the service request 12. The point service request and the credit service request are then sent to their corresponding request processing channels through processing threads. For example, the point service request is sent to the request processing channel 11 of the first type request processing channel 10, and the credit service request is sent to a request processing channel of the second type request processing channel 20. The point service request and the credit service request are processed by corresponding request processing channels respectively to generate access requests. Taking the point service request for example, the corresponding request processing channel of the point service request decrypts the encrypted point service request during a decryption stage.

Then, during a processing stage, the request processing channel generates an access request to a point database, which is used to inquiry user's point from database.

The processing stage of the point service request discussed above does not involve specific business or transaction, but only a simple inquiry of points. Therefore, the processing stage does not involve a work procedure. An electronic trading platform is always related to a specific business or transaction. Therefore, there must be a work procedure in an electronic trading platform. A predefined work procedure defines the types of messages a transaction needs.

An electronic trading platform which applies the ESB of the present invention must rely on a specific work procedure for implementation. Work procedures can be set according to different transactions. The work procedures are corresponding to predefined procedures which are stored in a procedure unit. When a service request is processed, work procedures are invoked according to needs of a processing stage of a service request.

Figure 3:
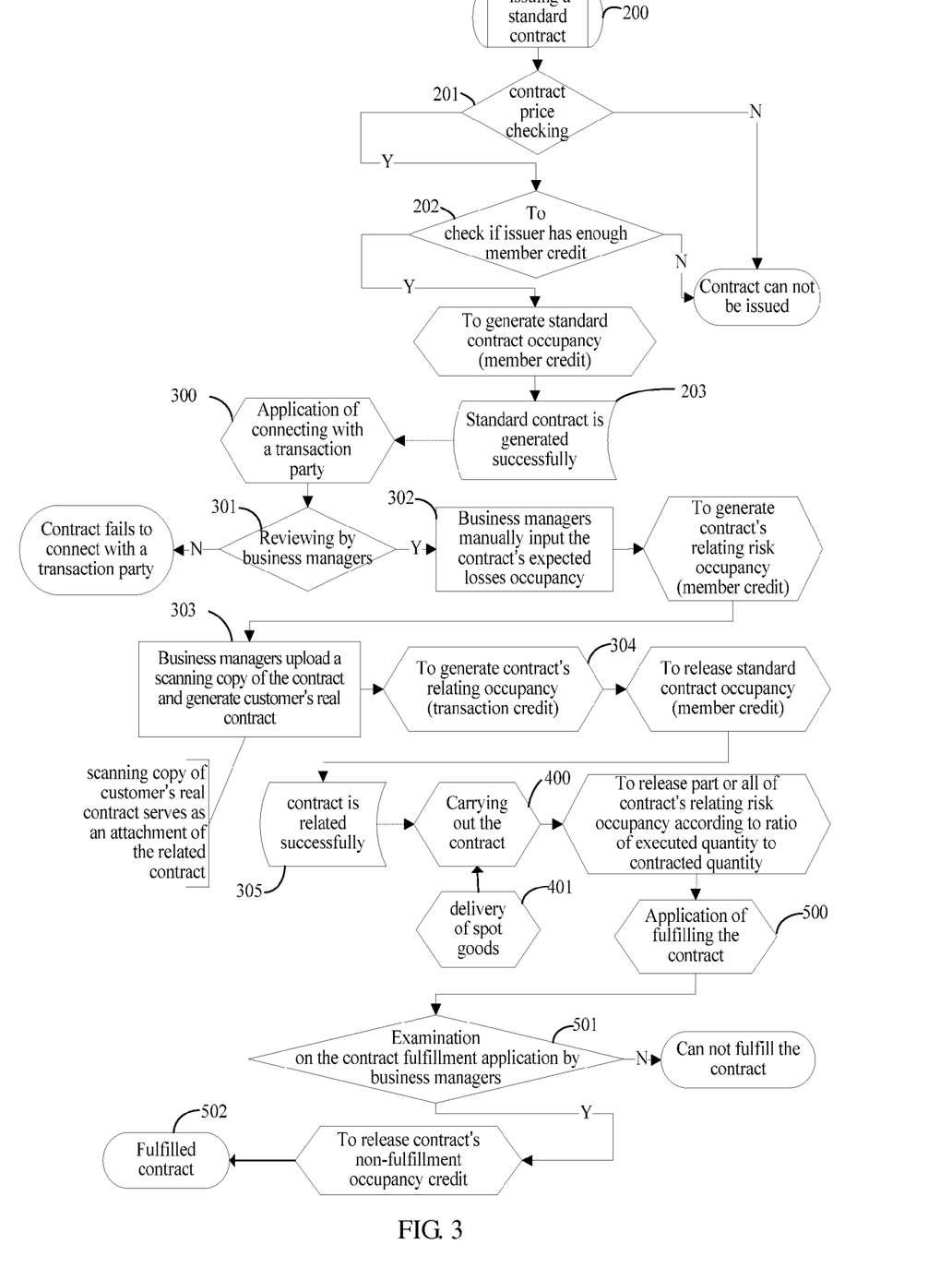
FIG. 3 is a flow chart for processing access requests in an embodiment of the present invention.

Taking contract transaction in an e-commerce trading platforms for example, the function of a work procedure in a processing stage is discussed here. FIG. 3 shows a work procedure of a complete contract transaction in a specific embodiment. Referring to FIG. 3, contract transaction includes four types of messages, which are issuing a standard contract 200 corresponding to a first type message, application of connecting with a transaction party 300 corresponding to a second type message, carrying out the contract 400 corresponding to a third type message, and application of fulfilling the contract 500 corresponding to a fourth type message. First, a member issues a standard contract. Then the member applies for connecting with a transaction party after which the contract is effective. After the contract comes into effect, the contract can be carried out and become the contract being carried out. The member can apply for fulfilling the contract, after part of the contract or the entire contract has been carried out. The contract then becomes the contract being fulfilled. The contract becomes a fulfilled contract after fulfilling the contract. The work procedure is complete.

FIG. 3 illustrates in detail the implementation of a contract transaction according to a predefined procedure.

A message is generated when a service user (an issuer) performs the issuing a standard contract 200. The message is a service request, which does not need a further split operation. During the message of issuing a standard contract is processed by a request processing channel in a processing stage, the request processing channel invokes the work procedure shown in FIG. 3 from a procedure unit. The request processing channel processes the service request in multiple steps according to predefined rules in the work procedures. In detail, the steps include a step 201 which is contract price checking, a step 202, and a step 203 in sequence. In step 201, the request processing channel invokes a reference contract price in a database. By comparing the price of the contract and the reference contract price, the request processing channel decides whether the contract price checking is a pass or fail. The step 202 is to check if issuer has enough member credit. After the service request passes the step 201, the request processing channel invokes a credit unit to check if the issuer of the contract has enough member credit. If the issuer does not have enough member credit, the standard contract can not be issued. If the issuer has enough member credit, a standard contract occupancy is generated. The request processing channel then invokes the credit unit to change the issuer's member credit. In step 203, standard contract is generated successfully, and a feedback is sent to the service user. The service request of issuing a standard contract has been finished.

Please continue referring to FIG. 3, if a manager of the electronic trading platform wants to purchase the issued standard contract and make the standard contract an effective contract, the manager performs the application of connecting with a transaction party 300. A message is generated when performing the application of connecting with a transaction party 300. The message, which is a second type message, is a service request. Therefore, the message does not need a further split operation. The request processing channel processes the service request in multiple steps according to predefined rules in the work procedures. In detail, the steps are a step 301, a step 302, a step 303, a step 304, and a step 305 in sequence. The step 301 is reviewing by business managers. The content of the review is made according to real needs. If a contract fails the reviewing by business managers in step 301, the contract can not connect with a transaction party, and a feedback is sent to the service user. If a contract passes the reviewing by business managers, step 302 is performed. In step 302, business managers manually input the contract's expected losses occupancy, and contract's relating risk occupancy (member credit) is generated. At the same time, the credit unit is invoked to change the member credit of the user. Then, step 303 is performed. In step 303, business managers upload a scanning copy of the contract, generate a customer's real contract, and make a scanning copy of customer's real contract as an attachment of the related contract. In step 304, a contract's relating occupancy is generated (transaction credit), and the standard contract occupancy (member credit) is release. At the same time, the credit unit is invoked to complete occupying the transaction credit and releasing the member credit. In step 305, the contract is related successfully, and is now an effective contract. A feedback of an effective contract being generated is sent back to the user.

Please continue referring to FIG. 3, when performing carrying out the contract 400, a third type message is generated. The message is a service request, which does not need a further split operation. The request processing channel processes the service request in multiple steps according to predefined rules in the work procedures. In detail, the steps include a step 401. Step 401 is delivery of spot goods. After the delivery of spot goods, the effective contract becomes the contract being carried out. The credit unit is invoked to release part or all of contract's relating risk occupancy according to the ratio of executed quantity to contracted quantity in the contract. And the result of the credit unit's operation is sent back as a feedback through a message receiving channel to the service user.

When a consignee receives the goods after the service user performs delivery of spot goods, the application of fulfilling the contract 500 is performed, which generates a fourth type message. The message is a service request, which does not need a further split operation. The request processing channel processes the service request in multiple steps according to predefined rules in the work procedures. In detail, the steps include step 501 and step 502 in sequence. Step 501 is to examination on the contract fulfillment application by business managers. If the contract fails the examination in step 501, the result is "can not fulfill the contract". If the contract passes the examination in step 501, the contract's non-fulfillment occupancy credit is released. The credit unit is invoked to complete releasing the non-fulfillment occupancy credit. After the contract is fulfilled, step 502 is performed. The contract being fulfilled becomes the fulfilled contract. Now the point unit can be invoked to evaluate and assign points for the contract.

When the above ESB provided in the present invention is applied in an electronic trading platform, service users do not have to invoke services from service providers directly. Service users and service providers are connect with the electronic trading platform through standard interfaces. The electronic trading platform integrates various applications through the ESB, which achieves communication and invokation among applications (in this embodiment, the credit unit is an example). Service users are no longer required to perform complicated asynchronous invocations, while ESB is adapted to convert a synchronous mode to an asynchronous mode.

In the above embodiment, only one contract message is used as an example to discuss the ESB. In other embodiments, multiple users will send multiple messages to the ESB at the same time. The ESB will set a predefined number of processing threads in the processing-thread-group. Therefore, only a set number of messages can be processed by the processing-thread-group at the same time, which avoids crash of the electronic trading platform caused by excessive service invokation on one service.

The parts outside the ESB are service providers and service users, which represent outer entities to be integrated by the ESB. The service users can communicate with the services of the service providers through the ESB.

Figure 4:
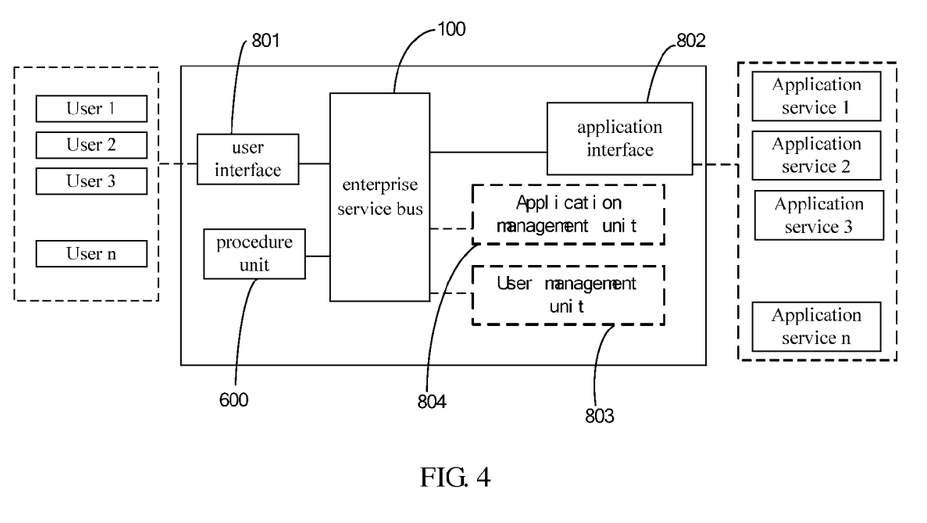
FIG. 4 schematically illustrates an ESB applied in an electronic trading platform in an embodiment of the present invention.

FIG. 4 schematically illustrates an ESB applied in an electronic trading platform. An ESB 100 is connected with a procedure unit 600. The procedure unit 600 is adapted for providing a work procedure corresponding to a service request to the ESB. In addition, a user interface 801 is provided in the electronic trading platform, which is adapted for providing access to the electronic trading platform for a user 1, a user 2 . . . and a user n. Users need to register in the electronic trading platform. Users are registered by a user management unit 803 through an identity authentication. The ESB also includes an application interface, which provides access to the electronic trading platform for application service 1, application service 2 . . . and application service n. When a service provider provides services to the electronic trading platform, an application management unit 804 performs authentication on the services. Only authenticated services by the application management unit 804 are published in the electronic trading platform through the ESB.

Corresponding to the above ESB, the present invention also provides a message processing method of the ESB.

The message processing method comprises the steps of: receiving messages each having at least one service request, sorting the received messages according to predefined rules, and processing service requests from a predefined number of the sorted messages.

In one embodiment, each of the messages has at least two service requests. The message processing method further includes a step of splitting the messages into service requests.

The processing service requests comprises: generating at least one access request according to a predefined procedure and invoking corresponding application services according to the access request.

In one embodiment, the messages each having at least one service request are encrypted. The message processing method further comprises a step of decrypting the messages before processing service requests.

Although the present invention has been illustrated and described with reference to the preferred embodiments of the present invention, those ordinary skilled in the art shall appreciate that various modifications in form and detail may be made without departing from the spirit and scope of the invention. Therefore, if these variations and modifications fall into the scope defined by the claims of the present invention and its equivalents, then the present invention intends to cover these variations and modifications.

What is claimed is:

1. An enterprise service bus (ESB) comprising:
    a message receiving unit, including multiple message receiving channels, each message receiving channel for receiving messages each having at least one service request;
    a message queuing unit for receiving messages from the multiple message receiving channels and for sorting the messages according to predefined rules;
    a processing-thread-group for receiving a predefined number of sorted messages from the message queuing unit; and
    a request processing unit for:
        acquiring service requests from messages from the processing-thread-group;
        invoking work procedures corresponding to the service requests, wherein the work procedures are pre-stored in the ESB, and each of the work procedures is corresponding to one of the service requests and defines specific procedures and rules for invoking one or more application services;
        generating access requests according to the work procedures; and
        invoking corresponding application services according to the access requests.

2. The ESB of claim 1 wherein sorting the messages according to predefined rules comprises sorting the messages according to time sequence of sending message or receiving message.

3. The ESB of claim 1 wherein each of the messages has at least two service requests and wherein the ESB further comprises a request splitting unit for splitting the messages into service requests and sending the service requests to the message receiving unit.

4. The ESB of claim 1 wherein each of the messages has at least two service requests and wherein the ESB further comprises a request splitting unit for splitting the messages received from the message receiving unit into service requests and for sending the service requests to the message queuing unit.

5. The ESB of claim 1 wherein each of the messages has at least two service requests and wherein the ESB further comprises a request splitting unit for splitting the messages received from the message queuing unit into service requests and sending the service requests to the processing-thread-group.

6. The ESB of claim 1 wherein the request processing unit comprises various types of request processing channels, each request processing channel for processing one type of service request.

7. The ESB of claim 1 wherein the ESB further comprises a request transmission channel for transmitting the access request generated by the request processing unit to corresponding application services.

8. The ESB of claim 1 wherein the messages each having at least one service request are encrypted and the ESB further comprises a decryption unit for decrypting the messages before the request processing unit processing the service requests according to a predefined procedure.

9. The ESB of claim 1, wherein the request processing unit, the processing-thread-group, the message queuing unit and the message receiving unit are further adapted for transmitting result messages generated by application services back to service users; and after all result messages for service requests in a message are received, the message receiving channels further invoke a request-packaging unit to package all result messages and send to a corresponding service user.

10. A message processing method of ESB, comprising:
receiving messages each having at least one service request;
sorting the received messages according to predefined rules; and
processing service requests from a predefined number of the sorted messages, wherein processing the service requests comprises:
invoke work procedures corresponding to the service requests, wherein the work procedures are pre-stored in the ESB, and each of the work procedures is corresponding to one of the service requests and defines specific procedures and rules for invoking one or more application services;
generating access requests according to the work procedures; and
invoking corresponding application services according to the access requests.

11. The message processing method of claim 10 wherein each of the messages has at least two service requests and wherein the message processing method further comprises splitting the messages into service requests.

12. The message processing method of claim 10 wherein the messages each having at least one service request are encrypted and wherein the message processing method further comprises decrypting the messages before processing service requests.

13. The message processing method of claim 10, further comprising transmitting result messages generated by application services back to application services; and after all result messages for service requests in a message are received, the message receiving channels further invoke a request-packaging unit to package all result messages and send to a corresponding service user.

14. A computer program product, comprising a non-transitory computer readable medium embodying a computer readable program for operation on a computer to implement an enterprise service bus (ESB), said program comprising:
a message receiving unit, including multiple message receiving channels, each message receiving channel for receiving messages each having at least one service request;
a message queuing unit for receiving messages from the multiple message receiving channels and for sorting the messages according to predefined rules;
a processing-thread-group for receiving a predefined number of sorted messages from the message queuing unit; and
a request processing unit for:
acquiring service requests from messages from the processing-thread-group;
invoking work procedures corresponding to the service requests, wherein the work procedures are pre-stored in the ESB, and each of the work procedures is corresponding to one of the service requests and defines specific procedures and rules for invoking one or more application services;
generating access requests according to the work procedures; and
invoking corresponding application services according to the access requests.

15. The computer program product of claim 14 wherein the sorting the messages according to predefined rules comprises sorting the messages according to time sequence of message sending or message receiving.

16. The computer program product of claim 14 wherein each of the messages has at least two service requests and wherein the ESB further comprises a request splitting unit for splitting the messages into service requests and sending the service requests to the message receiving unit.

17. The computer program product of claim 14 wherein each of the messages has at least two service requests and wherein the ESB further comprises a request splitting unit for splitting the messages received from the message receiving unit into service requests and sending the service requests to the message queuing unit.

18. The computer program product of claim 14 wherein each of the messages has at least two service requests and wherein the ESB further comprises a request splitting unit for splitting the messages received from the message queuing unit into service requests and sending the service requests to the processing-thread-group.

19. The computer program product of claim 14 wherein the request processing unit comprises various types of request processing channels, each request processing channel for processing one type of service request.

20. The computer program product of claim 14 wherein the ESB further comprises a request transmission channel for transmitting the access request generated by the request processing unit to corresponding application services.

21. The computer program product of claim 14 wherein the messages each having at least one service request are encrypted and wherein the ESB further comprises a decryption unit for decrypting the messages before the request processing unit processing the service requests according to a predefined procedure.

22. The computer program product of claim 14, wherein the request processing unit, the processing-thread-group, the message queuing unit and the message receiving unit are further adapted for transmitting result messages generated by application services back to service users; and after all result messages for service requests in a message are received, the message receiving channels further invoke a request-packaging unit to package all result messages and send to a corresponding service user.

23. A computer program product, comprising a non-transitory computer readable medium embodying a computer readable program for operation on a computer to implement a message processing method of ESB, said program comprising instructions that cause the computer to perform the steps of:
receiving messages each having at least one service request;
sorting the received messages according to predefined rules; and
processing service requests from a predefined number of the sorted messages, wherein processing the service requests comprises:
invoking work procedures corresponding to the service requests, wherein the work procedures are pre-stored in the ESB, and each of the work procedures is corresponding to one of the service requests and defines specific procedures and rules for invoking one or more application services;
generating access requests according to the work procedures; and
invoking corresponding application services according to the access requests.

24. The computer program product of claim 23 wherein each of the messages has at least two service requests and wherein the message processing method further comprises splitting the messages into service requests.

25. The computer program product of claim 23 wherein the messages each having at least one service request are encrypted and wherein the message processing method further comprises decrypting the messages before processing service requests.

26. The computer program product of claim 23, wherein the computer is further caused to perform the steps of: transmitting result messages generated by application services back to application services; and after all result messages for service requests in a message are received, the message receiving channels further invoke a request-packaging unit to package all result messages and send to a corresponding service user.

\* \* \* \* \*

UNITED STATES PATENT AND TRADEMARK OFFICE
CERTIFICATE OF CORRECTION

| | |
|---|---|
| PATENT NO. | : 8,805,938 B2 |
| APPLICATION NO. | : 12/935239 |
| DATED | : August 12, 2014 |
| INVENTOR(S) | : Gang Yu |

It is certified that error appears in the above-identified patent and that said Letters Patent is hereby corrected as shown below:

Title Page, (73) Assignee Delete "XiBen New Line Stock Co., Ltd." and insert
--XIBEN NEW LINE E-COMMERCE CO., LTD--.

Signed and Sealed this
Eleventh Day of August, 2015

Michelle K. Lee
*Director of the United States Patent and Trademark Office*